US012756417B1

(12) United States Patent
Cooper

(10) Patent No.: US 12,756,417 B1
(45) Date of Patent: Oct. 6, 2026

(54) MULTIPLE CELLULAR PHONE HOLDER

(71) Applicant: Trinita Cooper, Dunbar, WV (US)

(72) Inventor: Trinita Cooper, Dunbar, WV (US)

( * ) Notice: Subject to any disclaimer, the term of this patent is extended or adjusted under 35 U.S.C. 154(b) by 402 days.

(21) Appl. No.: 18/115,060

(22) Filed: Feb. 28, 2023

(51) Int. Cl.
*H04B 1/3888* (2015.01)
*A45C 11/00* (2006.01)
*H04M 1/04* (2006.01)

(52) U.S. Cl.
CPC ............ *H04B 1/3888* (2013.01); *A45C 11/00* (2013.01); *H04M 1/04* (2013.01); *A45C 11/002* (2025.01)

(58) Field of Classification Search
CPC ..... H04B 1/3888; A45C 11/00; A45C 11/002; H04M 1/04
See application file for complete search history.

(56) References Cited

U.S. PATENT DOCUMENTS 5,544,792 A * 8/1996 Arnwine .............. A45C 7/0086 224/652
8,777,002 B2 7/2014 Lonsdale, II et al.
8,989,826 B1 * 3/2015 Connolly ............... A45C 11/00 455/575.8
9,241,051 B1 * 1/2016 Peterson, III ......... H04M 1/185
9,278,652 B1 3/2016 Lundsgaard et al.
9,306,612 B2 * 4/2016 Forsythe ................. H04M 1/04
9,374,120 B1 * 6/2016 Halloran ................. A61F 17/00
9,647,712 B2 5/2017 Ryan et al.
9,762,280 B1 * 9/2017 Munn ..................... H04M 1/04
9,924,782 B1 * 3/2018 Burke ..................... A45C 11/00
9,948,344 B1 * 4/2018 Scott ..................... H04B 1/3888
10,577,151 B2 * 3/2020 Rizzuto .............. B65D 21/0201
10,764,417 B1 * 9/2020 Malach ................. H04B 1/3888
11,297,917 B1 * 4/2022 Malach ................. A45F 5/1516
11,671,526 B2 * 6/2023 Pahl ...................... H04B 1/3888 455/575.1
2007/0045373 A1 * 3/2007 Stewart, Sr. ............ A45F 5/022 224/684

(Continued)

OTHER PUBLICATIONS 5.7" Three Pockets Two Zippers Mobile Phone Bag Case For iPhone 6 6s Plus 5.5 inch universal phone bag pouch case. Product Listing [online]. © 2010-2022 AliExpress.com [retrieved on Mar. 19, 2021]. Retrieved from the Internet: <URL: https://www.aliexpress.us/item/2251832541313475.html?gatewayAdapt=glo2usa4itemAdapt&_randl_shipto=US>.

(Continued)

*Primary Examiner* — Lewis G West
(74) *Attorney, Agent, or Firm* — Cramer Patent & Design, PLLC.; Aaron R. Cramer

(57) ABSTRACT

The multiple cellular phone holder may comprise a first phone case, a second phone case, and a separator. The first phone case, the separator, and the second phone case may be joined in parallel with the separator positioned between the first phone case and the second phone case. The first phone case may be oriented to face in a first direction and the second phone case may be oriented to face in a second direction that is opposite the first direction. The first phone case may be operable to hold a first cellular phone and the second phone case may be operable to hold a second cellular phone such that both phones are adapted to be used separately. As a non-limiting example, the multiple cellular phone holder may enable a user to carry and use a personal cell phone and a business cell phone in one common phone case.

1 Claim, 3 Drawing Sheets

(56) References Cited

U.S. PATENT DOCUMENTS

| | | | | |
|---|---|---|---|---|
| 2014/0252054 | A1* | 9/2014 | Zhang | A45F 5/021 224/242 |
| 2016/0226182 | A1* | 8/2016 | Szeto | H01R 11/30 |
| 2016/0234356 | A1* | 8/2016 | Thomas | H04K 3/84 |
| 2017/0086557 | A1* | 3/2017 | Choi | A45C 15/00 |
| 2022/0061483 | A1* | 3/2022 | Milner | A45C 13/005 |
| 2023/0396281 | A1* | 12/2023 | Carter | H04B 1/3888 |
| 2024/0077917 | A1* | 3/2024 | Wei | H02J 50/402 |
| 2024/0222721 | A1* | 7/2024 | Ghantous | H02J 7/0047 |

OTHER PUBLICATIONS

Double Decker. Product Listing [online]. Story Leather, Inc.© 2023 [retrieved on Mar. 19, 2021]. Retrieved from the Internet: <URL: https://www.storyleather.com/smart-phone-cases/double-decker-holster-2-phones.html>.

* cited by examiner

MULTIPLE CELLULAR PHONE HOLDER

RELATED APPLICATIONS

Non-applicable.

FIELD OF THE INVENTION

The presently disclosed subject matter is directed to a case for a cellular phone and more specifically to a case that accommodates multiple cellphones.

BACKGROUND OF THE INVENTION

In the modern age in which we live, nearly everyone has a smart phone or cellular phone. Whether for playing games, communicating, doing work, contacting emergency services, or simply checking on the weather, most people are seldom without their cellular phone.

In order to protect a given phone, there are many options available with cases of all shapes, colors, and sizes available. However, in some instances, a person might need to secure and protect more than one phone. Accordingly, there exists a need for a means by which a person may protect and secure multiple cellular phones in one phone holder or case. The development of the multiple cellular phone holder fulfills this need in a manner that is efficient and cost effective.

SUMMARY OF THE INVENTION

The present invention provides for a multi-cellular phone holder having a first phone case having a first left side wall, a first right side wall, a first top side wall, a first bottom side wall, a first rear wall, and a first front side, the first phone case includes the first rear wall oriented to face in a first direction and the first phone case is adapted to hold a first cellular phone; a second phone case having a second left side wall, a second right side wall, a second top side wall, a second bottom side wall, and a second front side, the second phone case includes a second rear wall oriented to face in a second direction that is opposite the first direction, the second phone case is adapted to hold a second cellular phone; and a separator having a separator left side wall, a separator right side wall, and a separator end wall, the first phone case, the separator, and the second phone case are joined in parallel with the separator positioned between the first phone case and the second phone case.

The first front side of the first phone case may include a first phone access aperture for inserting and removing the first cellular phone. A left edge of the first rear wall may be coupled to a rear edge of the first left side wall and a right edge of the first rear wall coupled to a rear edge of the first right side wall. A top edge of the first rear wall may be coupled to a rear edge of the first top side wall and a bottom edge of the first rear wall is coupled to a rear edge of the first bottom side wall. A top edge of the first left side wall may be coupled to a left edge of the first top side wall and a bottom edge of the first left side wall is coupled to a left edge of the first bottom side wall.

A top edge of the first right side wall is coupled to a right edge of the first top side wall and the bottom edge of the first right side wall is coupled to a right edge of the first bottom side wall. The first cellular phone and the second cellular phone may be a personal cellular phone and a business cellular phone. The second front side of the second phone case may include a second phone access aperture for inserting and removing the second cellular phone.

The second cellular phone may be held in place by friction between the second cellular phone and the second left side wall, the second right side wall, the second top side wall, and the second bottom side wall. The second rear wall limits a depth that the first cellular phone may be placed into the first phone case.

A left edge of the second rear wall may be coupled to a rear edge of the second left side wall and a right edge of the second rear wall is coupled to a rear edge of the second right side wall. A top edge of the second rear wall may be coupled to a rear edge of the second top side wall and a bottom edge of the second rear wall is coupled to a rear edge of the second bottom side wall. A top edge of the second left side wall may be coupled to a left edge of the second top side wall and the bottom edge of the second left side wall is coupled to a left edge of the second bottom side wall. A top edge of the second right side wall may be coupled to a right edge of the second top side wall and a bottom edge of the second right side wall is coupled to a right edge of the second bottom side wall.

The first phone case and the second phone case may include one or more cutouts to provide access to one or more power controls, one or more volume controls, one or more power connectors, one or more headphone connectors, and other operator controls and connectors located on the sides of the first cellular phone and the second cellular phone. The separator may form a pocket located between the first phone case and the second phone case to hold one or more items accessed through a separator aperture. The one or more items may be selected from the group consisting of a driver license, an ID card, one or more credit cards, a bus pass, a subway pass, a plurality of currency, or any combination.

A bottom edge of the separator left side wall may be coupled to a left edge of the separator end wall and a bottom edge of the separator right side wall is coupled to a right edge of the separator end wall. A plurality of front edges of the separator left side wall, the separator right side wall, and the separator end wall may be coupled to the first rear wall of the first phone case and a plurality of rear edges of the separator left side wall, the separator right side wall, and the separator end wall are coupled to the second rear wall of the second phone case. The multi-cellular phone holder may be made of a material selected from the group consisting of silicone, polycarbonate, polyurethane, carbon fiber, or any combination.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
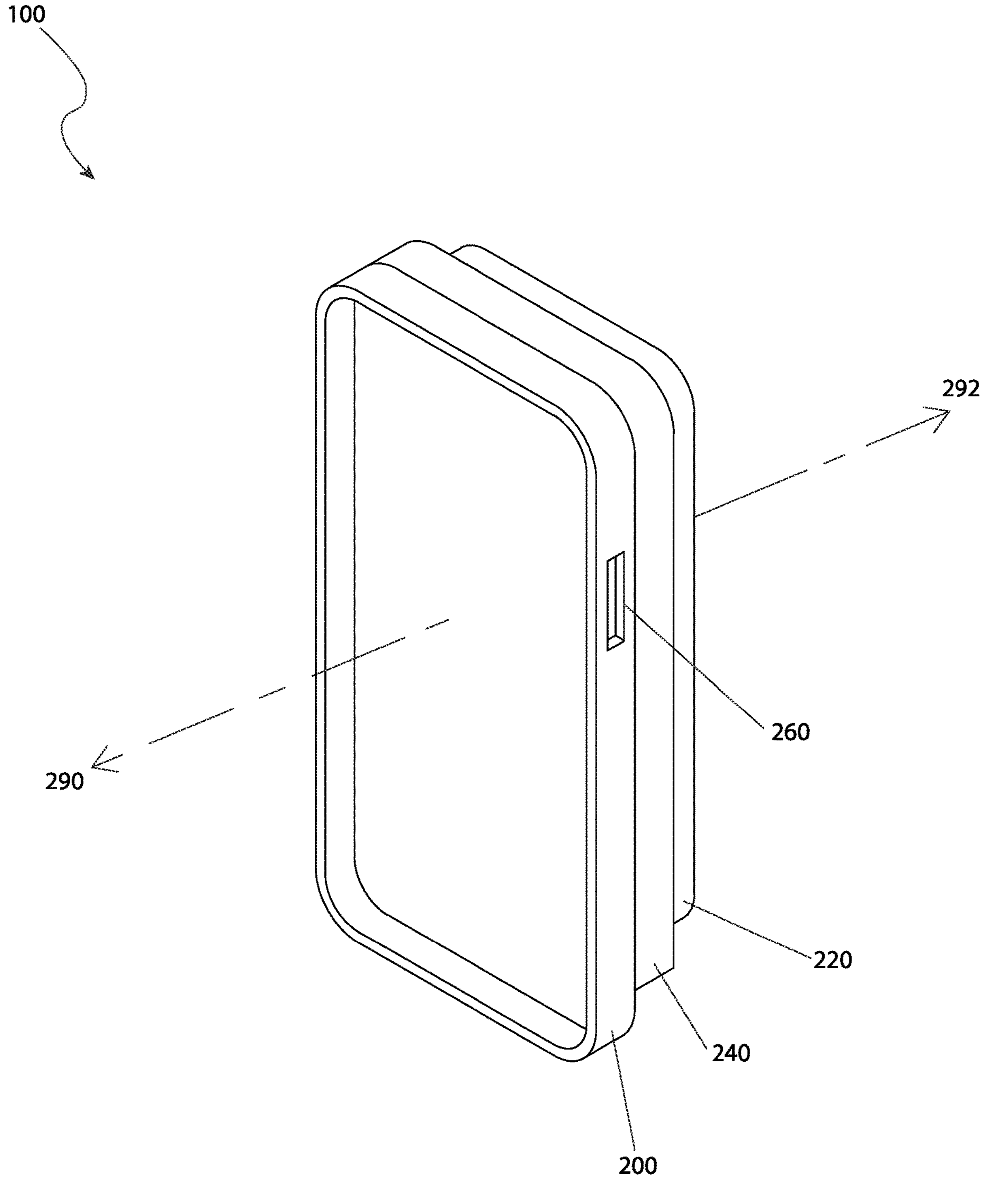
FIG. 1 is an isometric view of a multiple cellular phone holder, according to an embodiment of the present invention.
Figure 2:
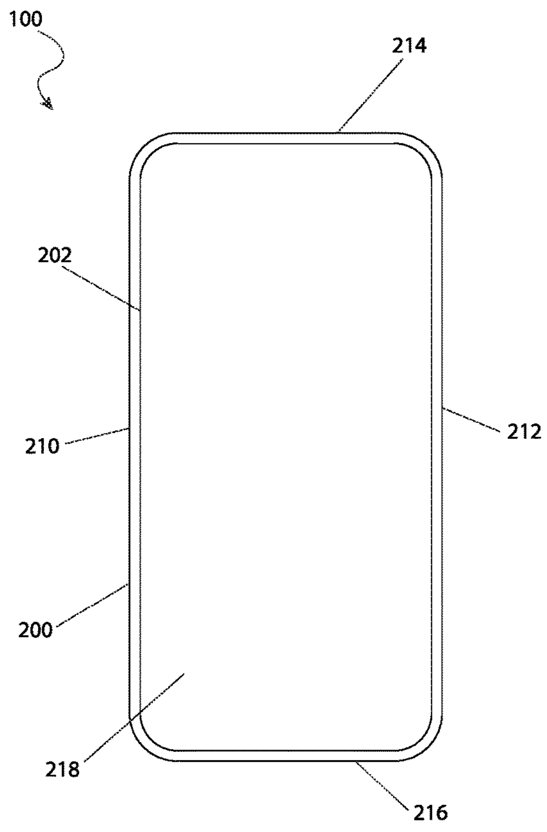
FIG. 2 is a front view of a multiple cellular phone holder, according to an embodiment of the present invention.
Figure 3:
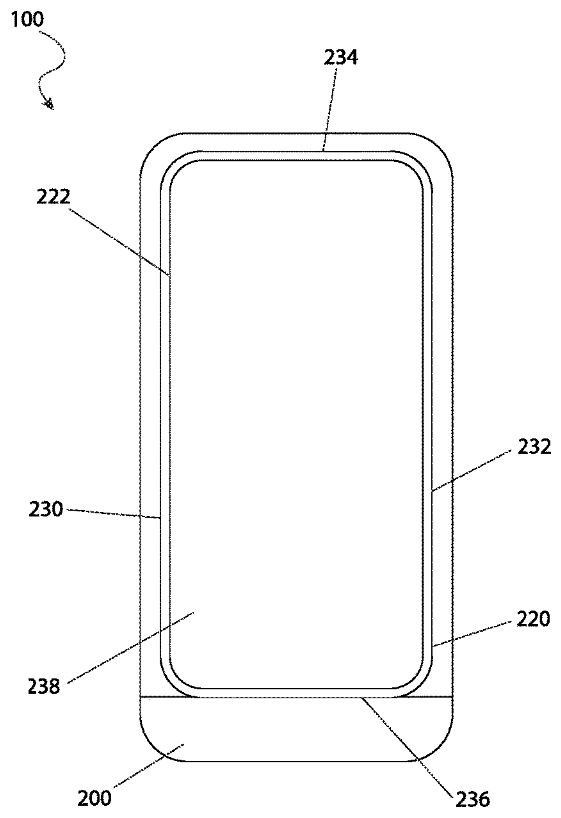
FIG. 3 is a rear view of a multiple cellular phone holder, according to an embodiment of the present invention.
Figure 4:
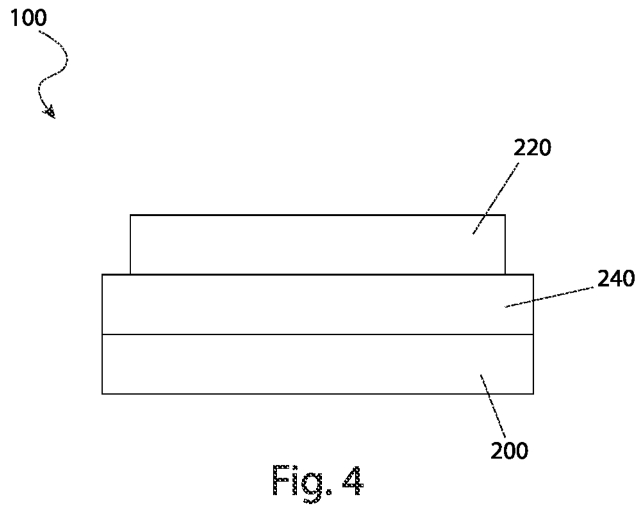
FIG. 4 is a bottom view of a multiple cellular phone holder, according to an embodiment of the present invention.
Figure 5:
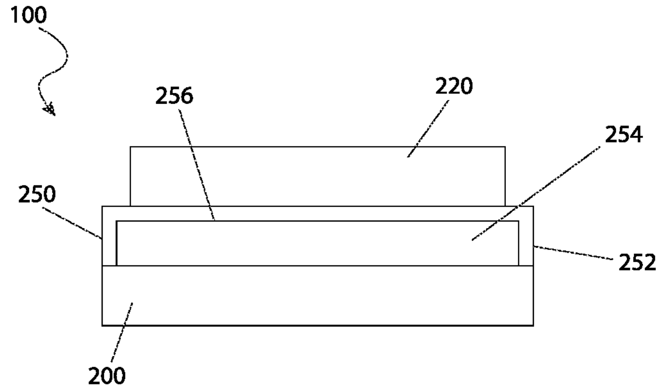
FIG. 5 is a top view of a multiple cellular phone holder, according to an embodiment of the present invention.
Figure 6:
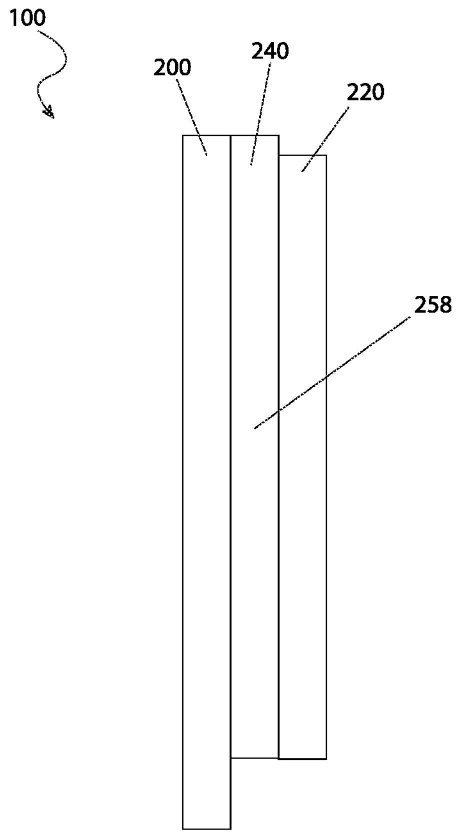
FIG. 6 is a side view of a multiple cellular phone holder, according to an embodiment of the present invention.

100 multiple cellular phone holder
200 first phone case
202 first phone access aperture
130 210 first left side wall
212 first right side wall
214 first top side wall
216 first bottom side wall
218 first rear wall
220 second phone case
222 second phone access aperture
230 second left side wall
232 second right side wall
234 second top side wall
236 second bottom side wall
238 second rear wall
240 separator
250 separator left side wall
252 separator right side wall
254 separator end wall
256 separator aperture
258 pocket
260 cutout
290 first direction
292 second direction 1. Description of the Invention As described in FIGS. 1 to 6, the present invention is directed to a multiple cellular phone holder (herein described as the "invention") 100. The invention 100 may comprise a first phone case 200, a second phone case 220, and a separator 240. The first phone case 200, the separator 240, and the second phone case 220 may be joined in parallel with the separator 240 positioned between the first phone case 200 and the second phone case 220. The first phone case 200 may be oriented to face in a first direction 290 and the second phone case 220 may be oriented to face in a second direction 292 that is opposite the first direction 290. The first phone case 200 may be operable to hold a first cellular phone and the second phone case 220 may be operable to hold a second cellular phone such that both the first cellular phone and the second cellular phone are adapted to be used separately and carried as a single unit. As a non-limiting example, the invention 100 may enable a user to carry and use a personal cell phone and a business cell phone in one combined phone case.

The first phone case 200 may comprise a first left side wall 210, a first right side wall 212, a first top side wall 214, a first bottom side wall 216, and a first rear wall 218. The front side of the first phone case 200 may comprise a first phone access aperture 202 which may be an opening for inserting and removing the first cellular phone.

The first cellular phone may be held in place by friction between the first cellular phone and the first left side wall 210, the first right side wall 212, the first top side wall 214, and the first bottom side wall 216.

The first rear wall 218 may limit the depth that the first cellular phone may be placed into the first phone case 200.

The left edge of the first rear wall 218 may be coupled to the rear edge of the first left side wall 210. The right edge of the first rear wall 218 may be coupled to the rear edge of the first right side wall 212. The top edge of the first rear wall 218 may be coupled to the rear edge of the first top side wall 214. The bottom edge of the first rear wall 218 may be coupled to the rear edge of the first bottom side wall 216. The top edge of the first left side wall 210 may be coupled to the left edge of the first top side wall 214. The bottom edge of the first left side wall 210 may be coupled to the left edge of the first bottom side wall 216. The top edge of the first right side wall 212 may be coupled to the right edge of the first top side wall 214. The bottom edge of the first right side wall 212 may be coupled to the right edge of the first bottom side wall 216.

The second phone case 220 may comprise a second left side wall 230, a second right side wall 232, a second top side wall 234, a second bottom side wall 236, and a second rear wall 238. The front side of the second phone case 220 may comprise a second phone access aperture 222 which may be an opening for inserting and removing the second cellular phone.

The second cellular phone may be held in place by friction between the second cellular phone and the second left side wall 230, the second right side wall 232, the second top side wall 234, and the second bottom side wall 236.

The second rear wall 238 may limit the depth that the first cellular phone may be placed into the first phone case 200.

The left edge of the second rear wall 238 may be coupled to the rear edge of the second left side wall 230. The right edge of the second rear wall 238 may be coupled to the rear edge of the second right side wall 232. The top edge of the second rear wall 238 may be coupled to the rear edge of the second top side wall 234. The bottom edge of the second rear wall 238 may be coupled to the rear edge of the second bottom side wall 236. The top edge of the second left side wall 230 may be coupled to the left edge of the second top side wall 234. The bottom edge of the second left side wall 230 may be coupled to the left edge of the second bottom side wall 236. The top edge of the second right side wall 232 may be coupled to the right edge of the second top side wall 234. The bottom edge of the second right side wall 232 may be coupled to the right edge of the second bottom side wall 236.

The separator 240 may comprise a separator left side wall 250, a separator right side wall 252, and a separator end wall 254. The separator 240 may form a pocket 258 located between the first phone case 200 and the second phone case 220. As non-limiting examples, a driver license, ID card, credit cards, bus pass, subway pass, currency, or any combination thereof may be carried in the pocket 258 within the separator 240.

The bottom edge of the separator left side wall 250 may be coupled to the left edge of the separator end wall 254. The bottom edge of the separator right side wall 252 may be coupled to the right edge of the separator end wall 254. The front edges of the separator left side wall 250, the separator right side wall 252, and the separator end wall 254 may be coupled to the first rear wall 218 of the first phone case 200. The rear edges of the separator left side wall 250, the separator right side wall 252, and the separator end wall 254 may be coupled to the second rear wall 238 of the second phone case 220. The hollow interior of the separator 240 may be accessed through a separator aperture 256.

In some embodiments, the first phone case 200, the second phone case 220, or both may comprise one (1) or more cutouts 260. The cutouts 260 may provide access to power controls, volume controls, power connectors, headphone connectors, and other operator controls and connectors located on the sides of the first cellular phone and the second cellular phone. The cutouts 260 may be located in the first left side wall 210, the first right side wall 212, the first top side wall 214, the first bottom side wall 216, the second left side wall 230, the second right side wall 232, the second top side wall 234, the second bottom side wall 236, or any combination thereof.

As non-limiting examples, the invention 100 may be made of silicone, polycarbonate, polyurethane, carbon fiber, or any combination thereof.

In some embodiments, the invention 100 may comprise a clip that may be adapted to detachably couple the invention 100 to a belt or a purse.

In some embodiments, the invention 100 may be operable to hold two phones of identical type and therefore the first phone case 200 and the second phone case 220 may be identical in size. In some embodiments, the invention 100 may be operable to hold two (2) phones of differing types and therefore the first phone case 200 and the second phone case 220 may be different dimensions. In this context, "type" may refer to the manufacturers and models of the two (2) phones.

In use, the first cellular phone may be inserted into the first phone case 200 via the first phone access aperture 202 and the second cellular phone may be inserted into the second phone case 220 via the second phone access aperture 222. A driver license, ID card, credit cards, bus pass, subway pass, currency, or any combination thereof may be inserted into the pocket 258 within the separator 240. The user may carry the invention 100 such that the user has access to both the first cellular phone and the second cellular phone.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A multiple cellular phone holder consisting of:

a first phone case having a first left side wall, a first right side wall, a first top side wall, a first bottom side wall, a first rear wall, and a first front side defining a first phone access aperture, the first phone case being configured to receive and retain a first cellular phone;

a second phone case having a second left side wall, a second right side wall, a second top side wall, a second bottom side wall, a second rear wall, and a second front side defining a second phone access aperture, the second phone case being configured to receive and retain a second cellular phone;

a separator positioned between the first phone case and the second phone case, the separator having a separator left side wall, a separator right side wall, and a separator end wall, the separator defining a pocket having a hollow interior accessible through a separator aperture;

wherein the first rear wall of the first phone case faces in a first direction and the second rear wall of the second phone case faces in a second direction opposite the first direction;

wherein a plurality of front edges of the separator left side wall, the separator right side wall, and the separator end wall are fixedly-coupled directly to the first rear wall of the first phone case;

wherein a plurality of rear edges of the separator left side wall, the separator right side wall, and the separator end wall are fixedly-coupled directly to the second rear wall of the second phone case;

wherein the first phone case, the separator, and the second phone case are joined together in a rigid, non-folding, non-hinged, parallel arrangement; and wherein the pocket is configured to receive one or more personal items selected from the group consisting of an identification card, a driver license, a credit card, a transit pass, bus pass, a subway pass, and currency.

* * * * *